April 14, 1970  R. MOUILLE ET AL  3,506,219
HELICOPTER STEERING AND PROPELLING DEVICE
Filed Nov. 29, 1967
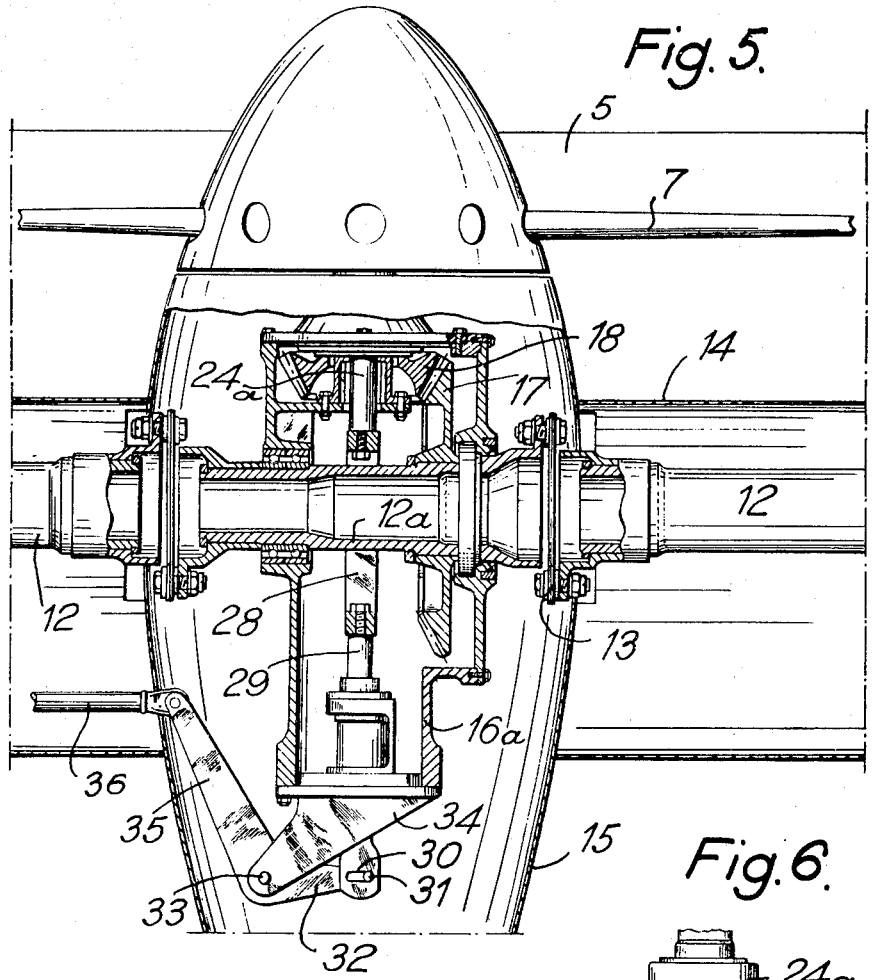
Fig. 5.
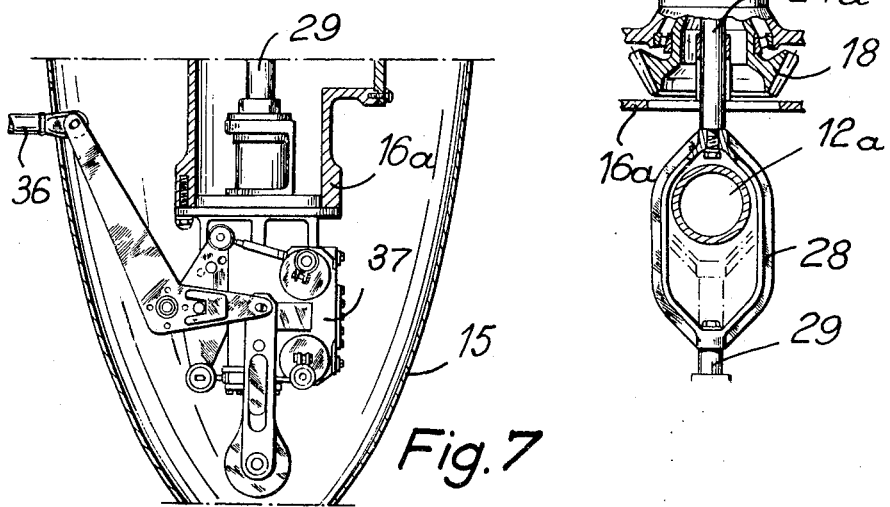
Fig. 6.
Fig. 7.

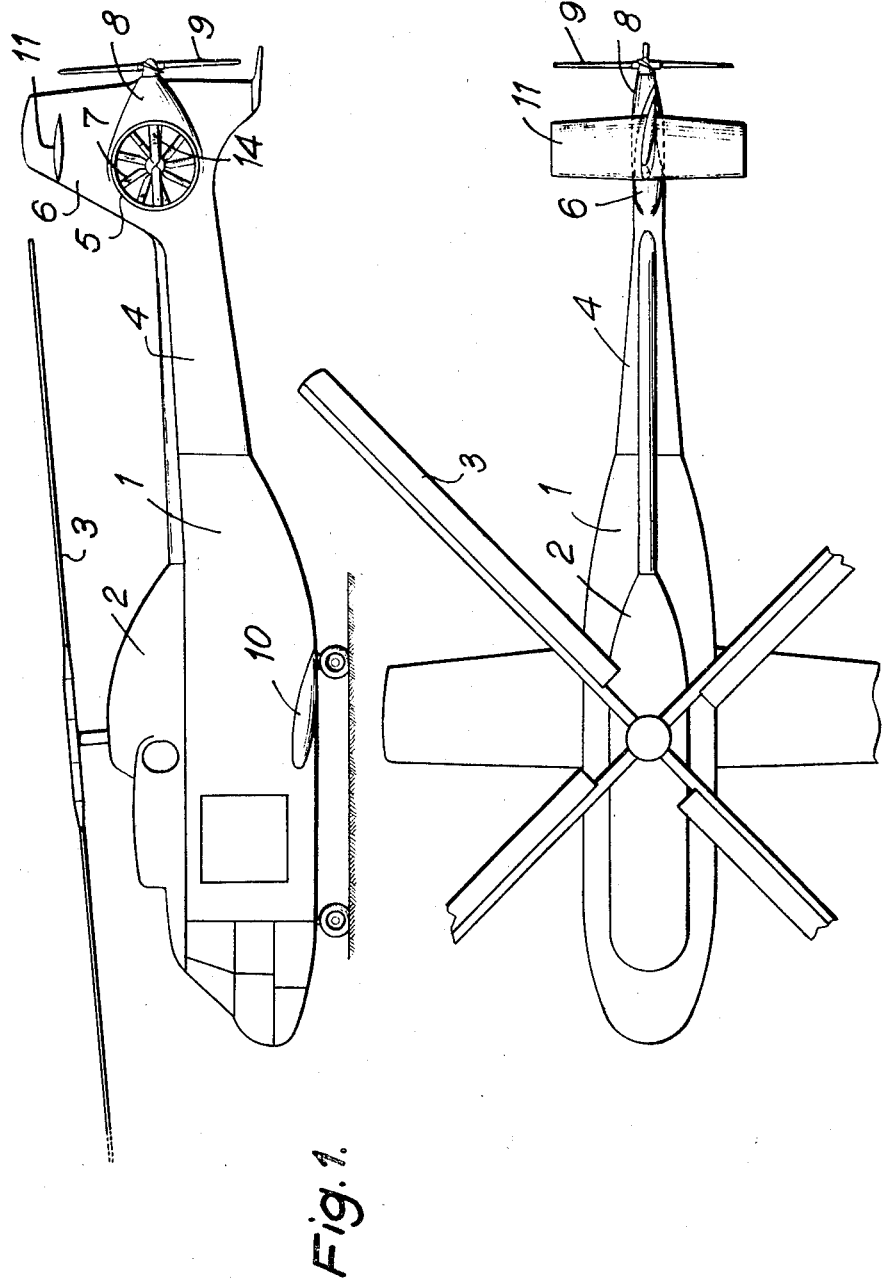

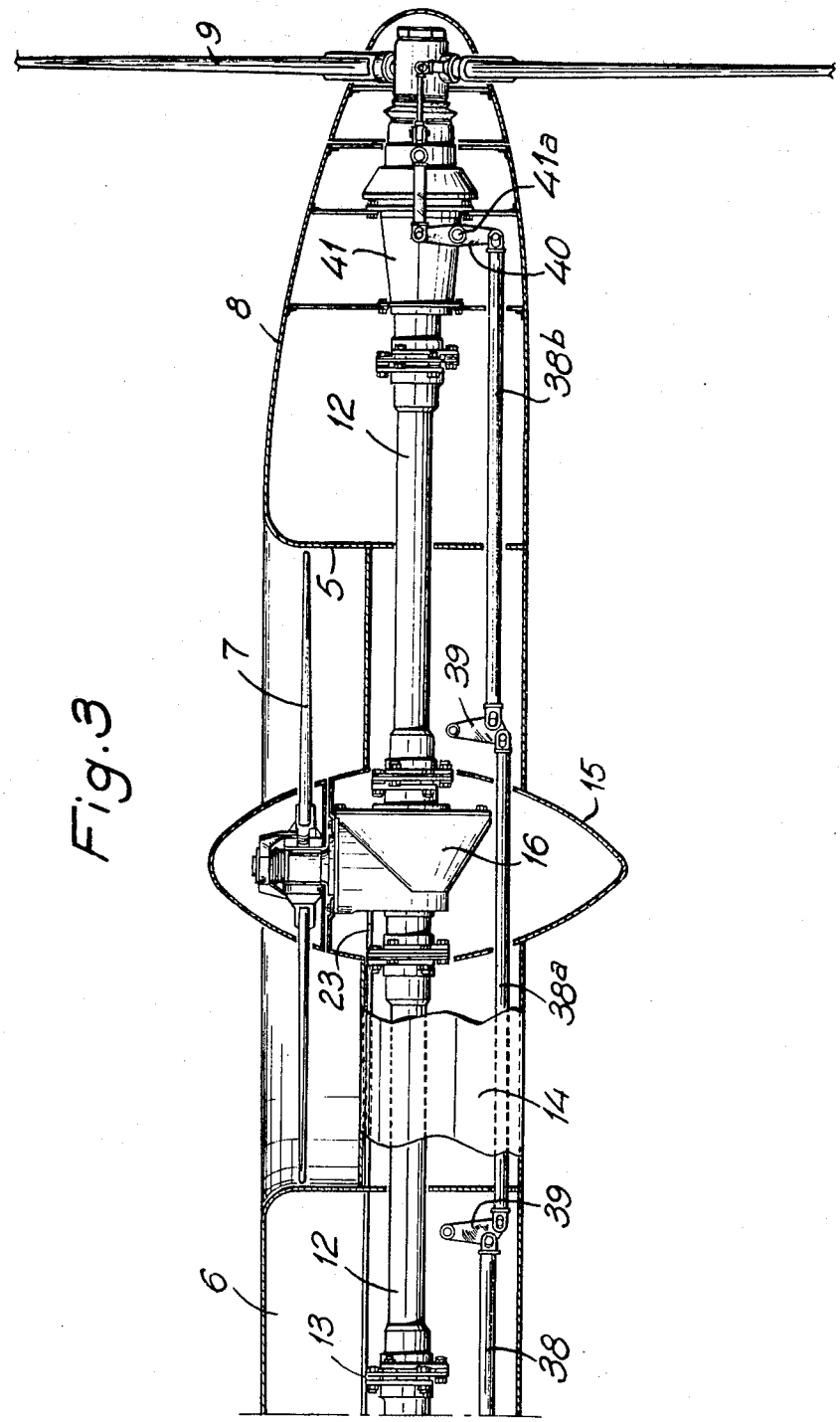

April 14, 1970 R. MOUILLE ET AL 3,506,219
HELICOPTER STEERING AND PROPELLING DEVICE
Filed Nov. 29, 1967 6 Sheets-Sheet 6
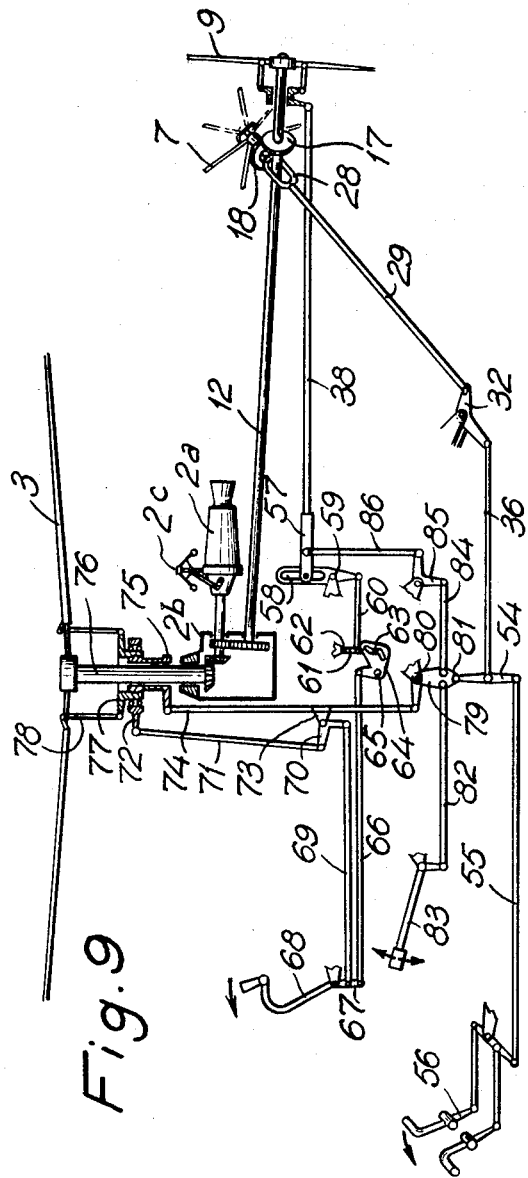
Fig.9
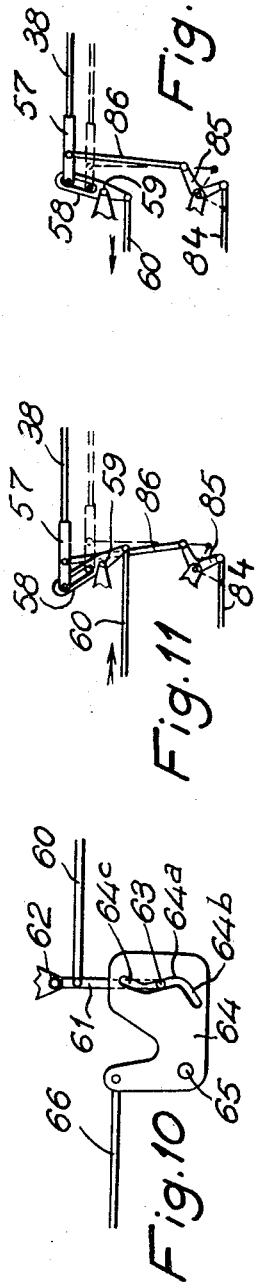
Fig.12
Fig.11
Fig.10

United States Patent Office 3,506,219
Patented Apr. 14, 1970

3,506,219
HELICOPTER STEERING AND PROPELLING DEVICE
René Mouille and Gaston Bourquardez, Aix-en-Provence, France, assignors to Sud-Aviation Societe Nationale de Constructions Aeronautiques, Paris, France
Filed Nov. 29, 1967, Ser. No. 686,418
Claims priority, application France, Dec. 13, 1966, 87,149
Int. Cl. B64c 27/22, 27/82
U.S. Cl. 244—17.21  5 Claims

ABSTRACT OF THE DISCLOSURE

A helicopter steering and propelling device comprises a propelling variable and reversible pitch tail air screw mounted aft of a vertical fin formed over part at least of its expanse with an airfoil providing lift laterally, there being a torque countering and steering variable and reversible tail rotor recessed in the thickness of the vertical fin. A direct transmission means couples the output of a power plant and the air screw, and a power takeoff means, interposed in the transmission means proximate the air screw, drives the tail rotor.

---

The present invention relates to a helicopter steering and propelling device, comprisng a propulsive tail airscrew associated to a steering tail rotor of small size recessed into a vertical fin at least part of the expanse of which is formed as an aerofoil for providing lateral lift.

Because helicopter speeds are limited by compressibility phenomena on the advancing blade of the lift rotor and stalling phenomena on the retreating blade thereof, one solution adopted for setting back this limit has consisted in relieving the main rotor of its propulsive function and causing the latter to be performed by an airscrew, for example.

The same reasons have lead to the development of special rotary aircraft of the hybrid type, in which the main rotor or rotors are partly or fully relieved of their lift function by recourse to fixed wings.

It has also been proposed to position a propulsive airscrew at the tail end of such aircraft, for reasons of safety, improved lift/drag ratio and mechanical simplicity.

It is also known to shroud the tail rotor within the vertical fin, which offers advantages from the point of view of efficiency, safety and drag.

It is lastly known to provide a vertical fin the aerofoil section and an angle of attack of which are such as to cause it to behave like a lifting surface that relieves the tail rotor to an extent proportional to the forward speed.

It is the object of the present invention to provide, by way of a special combination, a helicopter steering and propelling device comprising a propulsive tail airscew associated to a tail rotor of small size recessed into a vertical fin and to a fin of aerofoil section.

Such an assembly in accordance with the present invention offers the following advantageous features:

Direct transmission of the drive to the propulsive airscrew without intermediate gearing in the tail structure (because this airscrew must absorb a large part if not all of the motive power, it is important to avoid a transmission utilizing reduction gears or other gear combinations at the rear of the tail structure);

Apportionment as required of the motive power among the main lift rotor, the tail rotor and the propelling airscrew, through the use of separate controls for the collective pitch and the cyclic pitch of the lift rotor;

Separate controls operating on the collective pitches of the helicopter rotors and the propelling airscrew;

Simplification of the pilot's task, through crosslinking of these controls with the traditional controls (including throttle control) of the helicopter.

Such a disposition for the airscrew and the shrouded tail rotor is a particularly advantageous one: in additition to small size and safety, it provides a compact mechanical assembly which offers low drag at high speed and does not disrupt the flow through the airscrew yet retains effective steering capabilities. The association of this assembly to a fin with a suitable aerofoil section makes it possible, by providing lateral lift, to relieve the steering tail rotor of its torque countering function to a corresponding extent.

The description which follows with reference to the accompanying non-limitative exemplary drawings will give a clear understanding of how the invention can be carried into practice.

In the drawings:

FIGURE 1 is a side elevation view of such a helicopter.

FIGURE 2 is a plan view thereof with partial cutaway.

FIGURE 3, shows, in section through a substantially horizontal plane, the extremity of the tail of such a helicopter and the transmission to the shrouded steering tail rotor and the propelling airscrew.

FIGURE 5 is a corresponding view with partial cutaway of an alternative embodiment of such a mechanism.

FIGURE 6 shows on a smaller scale a fragmental profile view of such a mechanism, showing the intermediate ring in the pitch-changing linkage, which ring surrounds the tail airscrew drive shaft.

FIGURE 7 shows fragmentally an alternative embodiment of the mechanism in FIGURE 5, with its servomotor drive.

FIGURE 9 shows schematically an arrangement of lift rotor, steering tail rotor and propelling airscrew controls cross-linked with conventional helicopter piloting controls.

FIGURE 10 shows on an enlarged scale one of the mechanical relays forming a desmodromic cam with three camming slots in the control system of FIGURE 9.

FIGURES 11 and 12 show, in two opposite positions respectively, a second mechanical relay consisting of an oscillatable slide in the control system of FIGURE 9.

Figure 4:
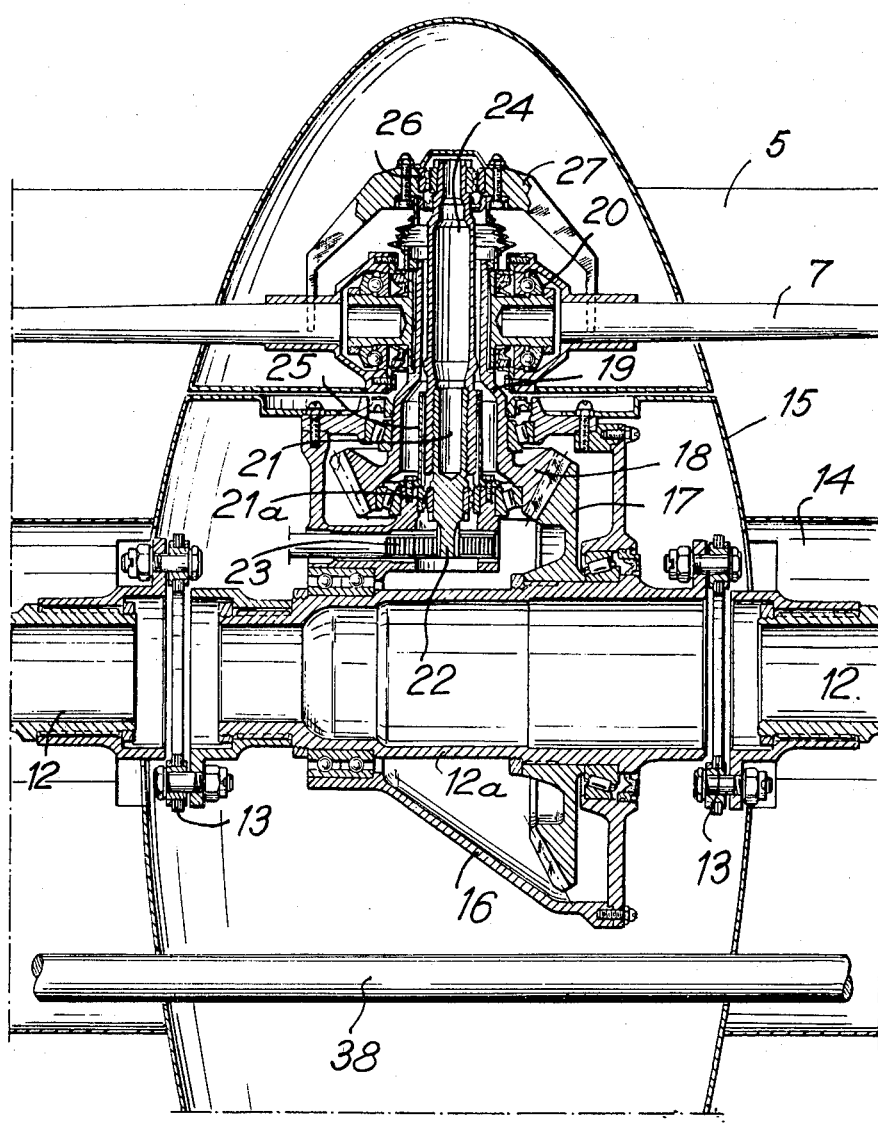
FIGURE 4 shows in section on an enlarged scale an embodiment of a mechanism for driving the steering tail rotor and controlling the blade pitch thereon.

Reference is first had to FIGURE 1 of the accompanying drawings for a showing of one specific form of embodiment wherein a helicopter comprises, in accordance with the present invention, a fuselage 1 the upper part 2 of which houses the turbine engines for example, and is surmounted by a lift rotor 3, and wherein the tail-boom 4 of this helicopter supports, within a hollow shrouding 5 formed in a fin 6, an anti-torque steering rotor 7 (hereinafter referred to as "tail rotor"), said fin being attached to a convex fairing 8 terminating in the spinner of a propelling tail airscrew 9.

The fuselage is additionally equipped with stubwings 10. The fin 6 is equipped with a horizontal stabilizer 11 and has an aerofoil section enabling it to provide part of the lateral aerodynamic force required of tail rotor 7.

The shrouded tail rotor 7 and tail airscrew 9 are driven by the powerplant 2a (FIGURE 9) housed in the fuselage top 2, via a ducted shaft 12 located at the top of the tailboom and consisting of a sequence of elements coupled together through the medium of splined ends and flexible joints 13 interposed between coupling sleeves formed with splines matching said splined ends. By means of an ultimate element and an ultimate joint, shaft 12 provides direct drive to the propelling airscrew 9 supported in a bearing-housing to be described hereinafter with reference to FIGURE 8. Inside the opening in faired housing 5 (FIGURE 3), shaft 12 extends through a streamlined spacer 14, in the central part of which is a streamlined cowling 15 for the housing 16 of a power takeoff from shaft 12 to tail rotor 7. Obviously, shaft 12 is so dimensioned as to enable it to transmit virtually all the available power at the rotation speed of propelling airscrew 9.

As is more clearly shown in FIGURE 4, housing 16 contains a section 12a of shaft 12 included between two joints 13, and this section 12a has keyed to it within housing 16 a bevel pinion 17 meshing with a companion bevel gear 18 carried by a hollow shaft 19 perpendicular to the axis of section 12a. This hollow shaft includes a splined extremity with which is engaged the matchingly splined hub 20 supporting the blades of rotor 7, and these blades have their roots pivotally mounted inside corresponding stubs on said hub.

Inside hollow shaft 19 is a hollow screw 21 mounted axially fast on antifriction bearings 21a located in housing 16, and this screw has an external thread thereon and carries an end pinion 22 meshing with the rack-teeth of a rod 23 capable of sliding axially. Mounted on said external thread, after the fashion of a nut, is an internally threaded tubular spacer 24 which has formed on its exterior, level with its internal thread, splines which cooperate with those of a fixed guiding bush 25 rigid with housing 16. The protruding end of spacer 24 supports, mounted on an antifriction bearing 26, a star-piece 27 whose points are hingedly connected to conventionally disposed intermediate linkages (not shown) which are in turn pivotally connected to the roots of blades 7, whereby axial shifts of the rack portion of rod 23 are converted by the rotation of hollow screw 21 into axial movements through the cooperating splines of bush 25 and spacer 24 and thereby result in the required changes of pitch.

Clearly, alternative methods may be used for controlling changes of pitch, and the required axial shift of tubular spacer 24 could be obtained on a similar component 24a (FIGURE 5) by causing the same to be fast with an oblong ring 28 surrounding the hollow drive shaft section 12a and attached at the same time to an operating pushrod 29 forming an extension of shaft 24a. Pushrod 29 may be operated by means of a slot 30 formed in a clevis-shaped extension of the pushrod and with which cooperates a pin 31 carried by one arm 32 of a bell-crank lever pivotally mounted via a pin 33 in a clevis 34 rigid with power takeoff housing 16a, the other arm 35 of said bell-crank lever being pivotally connected to a rod 36 for actuation thereof.

In the alternative embodiment of FIGURE 7, a servo-motor 37 fast with housing 16a is positioned between control rod 36 and pushrod 29, especially in the case of the heavier type of aircraft, such servo-motor being readily accommodated within the cowling 15 and more particularly in the nose thereof. This servo-motor, which is of any convenient type commonly used on helicopters, includes a slaved hydraulic actuator which, in the interests of reliability, may be of the type with two tandem-cylinders and two independent hydraulic feeds.

Figure 8:
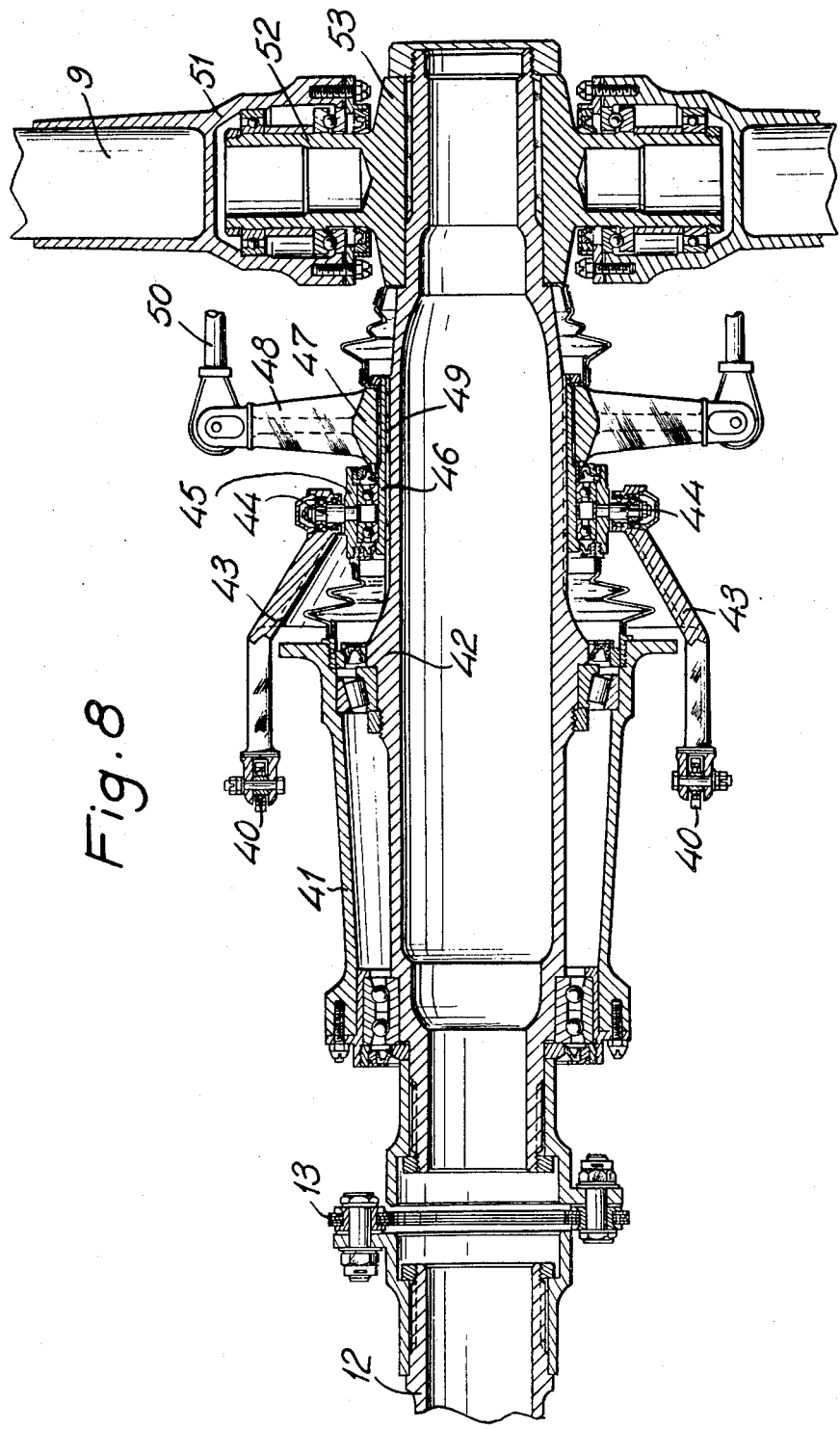
FIGURE 8 shows in longitudinal section the airscrew blade pitch changing mechanism.

As is clearly shown in FIGURES 3, 4 and 8, changes of pitch on the blades of propelling airscrew 9 are obtained by a linkage 38 which if need be includes a staggered element 38a within streamlined intermediate section 14, adjacent the point of passage through cowling 15, this being accomplished by couplings to two symmetrical levers 39. The end element 38b of linkage 38 is pivotally connected to an intermediate lever 40 fulcrumed about a pin 41a fast with the housing 41 for the bearings of the hub-carrying tip 42 of the propelling airscrew assembly.

Through the medium of fulcrum pin 41a of lever 40 is actuated a second symmetrical lever on the opposite side of casing 41, and the two levers 40 formed thus operate two cranked arms 43 pivotally mounted on the journals 44 of a ring 45 inside which is pivotally mounted an axially fixed bush 46 fast with a plate 47 bearing as many arms 48 as there are blades on airscrew 9. Bush 46 is slidably mounted through the agency of matching splines 49 formed on hub-carrying tip 42.

Each arm-end 48 is pivotally connected to a link 50 which though not shown in the drawings, is in turn pivotally connected to an arm forming part of the root 51 of the corresponding blade, which root portion is rotatably mounted in a stub 52 formed on the airscrew hub 53 keyed to the extremity of hub-carrying tip 42.

Thus, the blade pitch of airscrew 9 can be varied by operating on linkage 38.

The pitch angles of the blades of shrouded tail rotor 7 and propelling airscrew 9 may be made to assume positive or negative values, respectively on either side of a zero-pitch position at which no thrust is exerted.

It will be manifest from the foregoing that the necessary power can be transmitted directly to propelling airscrew 9 without intermediate gear-trains at the rear end of tail-boom 4. This is an obvious advantage, for since this airscrew may be required to absorb a major part of the power delivered by the powerplant it is important to avoid disposing a tail-end reduction gear the weight of which would unfavourably affect the longitudinal center-of-gravity location of the helicopter.

Manifestly, by means of linkage systems such as 23 or 36 and 38, a helicopter pilot may select blade pitches for rotor 7 and airscrew 9 permitting a continuous transition from a configuration wherein the airscrew is propulsive to a configuration wherein the airscrew produces a braking effect, there being an intermediate position in which minimum power is absorbed. Further, tail rotor 7, which fulfils a torque-opposing function and a steering function in the hovering mode, during changing flight manoeuvres and during cruise flight, by means of its independent collective pitch control, also permits continuous transition from a leftwardly directed lateral force to a rightwardly directed lateral force, and vice versa.

Whilst it would be possible for these pitch controls to be kept separate, in order to simplify the pilot's task it is possible to coordinate and cross-link them with the conventional flight controls and throttle control of the helicopter.

Such a cross-linkage arrangement is shown more particularly in FIGURES 9 through 12, in which it is accomplished by entirely mechanical means. Obviously, however, any other convenient all-hydraulic, electric, pneumatic, or composite system may be used.

In the diagrammatic showing of FIGURE 9, the rotor 3 is driven by a turbine engine 2a via a transmission box 2b from which emerges the shaft 12 which drives airscrew 9 directly and tail rotor 7 through a bevel coupling 17, 18. The blade pitch varying ring 28 of rotor 7 is rigid with pushrod 29, which is connected to rod 36 through the medium of bell-crank 32.

Rod 36 is pivotally connected to a lever 54 of which one end is connected to a rod 55 actuated by steering pedals 56.

The rod 38 for controlling changes of pitch in propelling airscrew 9 terminates in a clevis 57 the pin of which extends through a slot in a slideway 58 fulcrumed at 59. The slot-remote end of slideway 58 is pivotally connected to a rod 60 which is articulated substantially midway along a short lever 61 hinged about a pin 62. The end of lever 61 bears a follower-peg 63 which cooperates with the camming slots of a desmodromic cam 64, mounted pivotally about a pin 65, and a lever-forming extension of this cam is hinged to a rod 66 which is in turn hinged to a downward extension 67 of the cyclic pitch control column 68. The portion 67 of column 68 is pivotally connected to a rod 69 extending up to a bell-crank 70, to the other arm of which is hinged a rod 71 extending up to the swashplate 72 of main rotor 3. The fulcrum pin of bell-crank 70 is mounted in a clevis 73 fast with a rod 74 attached to the base of collective-pitch sleeve 75. The sleeve 75 slides over main rotor shaft 76 and bears thereon the bearing surface for swivelling motion of swashplate 72, the inner rotating element 77 of which is connected to the rods 78 for coupling with the several main-rotor blade roots and for changing the pitch angles thereof.

Rod 74 is attached to one arm of a bell-crank 79 fulcrumed about a pin 80 and the other arm of which bears at once the hinge-pin 81 of lever 54, the hinge-pin of a rod 82 connecting with collective pitch change lever 83 and the hinge-pin of a rod 84 connected via a bell-crank 85 to a further rod 86 pivotally connected to clevis 57, whereby to constitute a summing relay.

It should also be noted that engine 2a is equipped with a governor 2c.

The lateral cyclic control system is not shown but may include similar cross-linkages between the cyclic pitch control and the tail rotor pitch control systems.

The principle of operation of the system described hereinabove is as follows:

The pedals 56 control the pitch of tail rotor 7 jointly with collective pitch lever 83, through the medium of bell-crank 79 which, together with lever 54, forms the summing relay referred to precedingly. Thus, with an appropriately selected transmission ratio, the torque-countering force can be proportioned to the collective pitch so as to virtually compensate for the reaction torque due to main rotor 3. The necessary corrections are accomplished by movements of limited amplitude on pedals 56, the remaining major part of the latters' travel being available for steering.

Cyclic control column 68 controls the thrust of airscrew 9 when it is moved longitudinally, and desmodromic cam 64 operates in the manner to be described hereinbelow, by virtue of its three associated camming slots, to wit: a middle arcuate slot 64a centered upon pin 65, a slot 64b at one end of slot 64a and a slot 64c at the other end thereof. Slot 64b lies within the circle upon which slot 64a is radiused and slot 64c is external thereto.

In the midway portion of the travel of column 68, cam 64 operates via arcuate slot 64a, so that its movement has no effect on rod 60.

In this midway part of the travel of column 68, which corresponds to hovering flight, absence of movement by rod 60 means that there is no effect on airscrew 9, the blades of which are accordingly set at zero-pitch angle. Airscrew 9 therefore windmills.

In the forward portion of the travel of column 68, cam 64 operates via its slot 64c, whereby rod 60 is drawn back and tilts the slideway 58, thus imparting a positive propulsion pitch to airscrew 9.

In the rearward part of the travel of column 68, cam 64 operates via slot 64b, which again operates via slideway 58 to obtain a negative pitch on airscrew 9, which then delivers negative thrust for retardation purposes.

The effect of cyclic pitch control column 68 on the thrust of propelling airscrew 9 depends on the collective pitch of rotor 3, by virtue of slideway 58, for, along the midway part of its travel shown in FIGURE 9, slideway 58 is perpendicular to the direction of rod 38 and its extending clevis 57, so that control action on the collective pitch by means of lever 83 causes clevis 57 to shift without notable effect on the pitch of airscrew 9.

Conversely, in the forward part of the travel of column 68, as shown in FIGURE 11, slideway 58 tilts its slotted portion forward in response to cooperation of peg 63 with camming slot 64c, so that, in moving from the coarse collective-pitch position to the fine collective-pitch position, rod 38 is drawn forward to increase the pitch of airscrew 9 and thereby augment the propulsive thrust.

Using an appropriate actuating system it is possible to ensure that the sum of the power required by rotor 3 and airscrew 9 remains virtually constant as a function of the position of cyclic pitch column 68. Engine 2a is equipped with a governor 2c, and the latter makes the power corrections needed to keep the rotation speeds of rotor 3 and airscrew 9 constant.

In contradistinction, when column 68 is moved over the rear part of its travel, as shown in FIGURE 12, the slotted portion of slideway 58 is tilted backwards, so that when the blades of rotor 3 change from a coarse collective pitch to a fine collective pitch the airscrew 9 passes into the reverse-thrust position.

This ensures improved braking efficiency during the ultimate phase of the approach flare-out when the collective pitch of rotor 3 is reduced, together with automatic power compensation between rotor 3 and airscrew 9 that facilitates operation of governor 2c.

In short, considering first the tail rotor 7, it will be understood that pedals 56 control it by an effect which, through summing relay 54–79, is combined with the effects due to a change in collective pitch obtained by lever 83, whereby any increase in the collective pitch and consequent increase in the lift provided by the main rotor, for example, increases the torque-countering force of tail rotor 7.

Considering next the airscrew 9, an increase in the cyclic pitch of rotor 3 obtained with column 68 operates, through the medium of cam 64, on propelling airscrew 9 in such manner that, for example:

A coarsening of the cyclic pitch for the purpose of forward flight causes the airscrew pitch to be set to produce propulsive thrust;

In the hovering mode, there is no effect on airscrew 9 because movement of control column 68 within the limits corresponding to this flight mode does not change the pitch of airscrew 9; and A reduction in the cyclic pitch of rotor 3 causes the aircraft to be decelerated by airscrew 9 which, in the limit case, assumes the reverse-thrust configuration: changes in collective pitch on rotor 3 have no effect on airscrew 9 in the hovering mode, for on the one hand cam 64 operates via its camming slot 64a, and on the other hand the slotted portion of slideway 58 (which is then substantially parallel to rod 86 and perpendicular to rod 38) permits free motion of clevis 57 without longitudinal motion of rod 38.

A change in the collective pitch of lift rotor 3 by means of lever 83 produces a change of pitch in airscrew 9, when a change in cyclic pitch causes cam 64 to shift and thereby render either of its camming slots 64b or 64c operative, thus tilting slideway 58 correspondingly.

It goes without saying that many changes and substitutions of parts may be made to the specific forms of embodiment hereinbefore described without departing from the spirit and scope of the invention.

Obviously, any convenient mechanical, hydraulic, pneumatic, electric or composite control system may be used alike for the individual controls and for the cross-linked controls, provided that such a control system exhibits the fundamental characteristics of the interlock by ensuring continuous and gradual variations of pitch at the required rates and over ranges extending from given positive to given negative pitch angles, for the airscrew and the tail rotor individually.

What we claim is:

1. A helicopter having a power plant and a vertical fin, and comprising a steering and propelling device including a propelling variable and reversible pitch air screw proximate the vertical fin, said vertical fin being formed over at least part of its expanse with an airfoil providing lift laterally, a reversible pitch rotor recessed in the thickness of said vertical fin for adjustably countering torque and varying steering, direct transmission means between said power-plant and said air screw, and power takeoff means interposed in said transmission means, proximate said air screw, for driving said tail rotor.

2. A device as claimed in claim 1 comprising a streamlined spacer element through which said direct transmission means passes, said streamlined spacer element being ransversely disposed in a fairing for said tail rotor, said spacer supporting a second fairing containing said power takeoff from said direct transmission means to said tail rotor, and control means for the blade pitch of said tail rotor and said tail air screw, said spacer element forming further a passageway for said control means.

3. A device as claimed in claim 1 comprising cross-linked pitch controls for said air screw and tail rotor, said cross-linked pitch controls comprising, for varying the pitch of said tail rotor, a connection to steering pedals through a summing relay actuated at once by said pedals, by a lift rotor collective pitch control, and for all flight modes other than hovering by control means of the blade pitch of said tail air screw.

4. A device as claimed in claim 3 comprising a mechanical actuating linkage for adjusting the air screw blade pitch including a desmodromic cam and a slideway connected to a control column for adjusting the cyclic pitch of said lift rotor, said desmodromic cam comprising three camming slots including a middle slot radiused about a pivotal point of said cam whereby to have no effect on the position of said slideway, said middle slot being extended at one end by a camming slot which recedes from said pivotal point and at the other by a camming slot which approaches said point, the last-mentioned two camming slots causing opposite tilting motions of said slideway, a terminal slide on the linkage means cooperating with said slideway for actuating the pitch-changing mechanism of said air screw, and linkage means locating said slide in said slideway with said summing relay.

5. A device as claimed in claim 4 comprising a slideway in a position for cooperation with said middle camming slot of said desmodromic cam wherein it is substantially perpendicular to a linkage member for controlling the air screw blade pitch and substantially parallel to a linkage member which is connected to said summing relay and which shifts said slide.

References Cited

UNITED STATES PATENTS

| 2,381,417 | 8/1945 | Adams | 170—135.22 |
| 2,698,059 | 12/1954 | Pullin | 170—135.22 |
| 2,698,147 | 12/1954 | Hovgard | 244—7 |
| 2,818,224 | 12/1957 | Sikorsky | 244—17.19 |
| 3,199,601 | 8/1965 | Dean et al. | 244—17.21 XR |
| 3,212,583 | 10/1965 | Todd et al. | 170—135.22 XR |
| 3,332,643 | 7/1967 | Toner | 244—7 |

FOREIGN PATENTS

| 637,938 | 2/1928 | France. |
| 1,300,845 | 7/1962 | France. |
| 332,415 | 11/1935 | Italy. |

OTHER REFERENCES

Aviation Week, Sept. 20, 1965, p. 32.

FERGUS S. MIDDLETON, Primary Examiner

P. E. SAUBERER, Assistant Examiner

U.S. Cl. X.R.

170—135.24; 244—7